US012209527B2

(12) United States Patent
Graf et al.

(10) Patent No.: US 12,209,527 B2
(45) Date of Patent: Jan. 28, 2025

(54) METHOD AND DEVICE FOR OPERATING AN INTERNAL COMBUSTION ENGINE

(71) Applicant: Robert Bosch GmbH, Stuttgart (DE)

(72) Inventors: Benedikt Graf, Ludwigsburg (DE); Christian Disch, Wimsheim (DE); Conrad Bubeck, Esslingen (DE); Stefan Bauer, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/424,550

(22) Filed: Jan. 26, 2024

(65) Prior Publication Data

US 2024/0287927 A1 Aug. 29, 2024

(30) Foreign Application Priority Data

Feb. 23, 2023 (DE) ..................... 10 2023 201 675.3

(51) Int. Cl.

*F01N 3/30* (2006.01)
*F01N 3/20* (2006.01)
*F01N 3/32* (2006.01)
*F01N 9/00* (2006.01)
*F01N 11/00* (2006.01)
*F02D 41/00* (2006.01)
*F02M 35/024* (2006.01)

(52) U.S. Cl.

CPC .......... *F01N 3/306* (2013.01); *F01N 3/2033* (2013.01); *F01N 3/32* (2013.01); *F01N 9/00* (2013.01); *F01N 11/007* (2013.01); *F02D 41/0002* (2013.01); *F02M 35/024* (2013.01)

(58) Field of Classification Search

CPC .......... F01N 3/306; F01N 3/2033; F01N 3/32; F01N 9/00; F01N 11/007; F02D 41/0002; F02M 35/024

See application file for complete search history.

(56) References Cited

U.S. PATENT DOCUMENTS

2014/0060040 A1* 3/2014 Zhang .................. F01N 3/2066 60/273
2018/0030915 A1* 2/2018 Odendall ............. F02D 41/222

(Continued)

FOREIGN PATENT DOCUMENTS

DE 4320880 A1 1/1994
DE 19508013 C1 3/1996
DE 112008000132 T5 11/2009

*Primary Examiner* — Brandon D Lee

(74) *Attorney, Agent, or Firm* — NORTON ROSE FULBRIGHT US LLP; Gerard A. Messina

(57) ABSTRACT

A method and device for operating an internal combustion engine including a first air duct supplying air to a cylinder of the internal combustion engine, and a second air duct supplying air to a heater for heating an exhaust system. The first and the second air duct each have at least one control element for controlling the amount of air flowing through. The first and the second air ducts are connected by a third air duct to an air filter for providing filtered ambient air to the internal combustion engine. A mass flow sensor is arranged in the third air duct for measuring an amount of air flowing through the third air duct. The measured signal of the mass flow sensor is used to regulate the amount of air flowing through the first and second air ducts as a function of operating states of the internal combustion engine.

11 Claims, 2 Drawing Sheets

(56) References Cited

U.S. PATENT DOCUMENTS

| | | | | |
|---|---|---|---|---|
| 2020/0271046 | A1* | 8/2020 | Kelly | F02B 37/10 |
| 2020/0294332 | A1* | 9/2020 | Yonezawa | F02D 41/221 |
| 2022/0298946 | A1* | 9/2022 | Dudar | F02D 41/064 |
| 2022/0381204 | A1* | 12/2022 | Peters | F02D 23/00 |
| 2023/0059437 | A1* | 2/2023 | Yang | F01N 3/2006 |

* cited by examiner

METHOD AND DEVICE FOR OPERATING AN INTERNAL COMBUSTION ENGINE

CROSS REFERENCE

The present application claims the benefit under 35 U.S.C. § 119 of German Patent Application No. DE 10 2023 201 675.3 filed on Feb. 23, 2023, which is expressly incorporated herein by reference in its entirety.

FIELD

The present invention related to a method and a device for operating an internal combustion engine.

BACKGROUND INFORMATION

German Patent No. DE 195 08 013 C1 describes an air supply to an internal combustion engine in which a first air duct and a second air duct are provided. Air is supplied through the first air duct to cylinders of the internal combustion engine. Air is supplied through a second air duct to a heater for heating an exhaust system of the internal combustion engine.

SUMMARY

A method according to the present invention and a device according to the present invention for operating an internal combustion engine with a first air duct for supplying air to a cylinder of the internal combustion engine and a second air duct for supplying air to a heater for heating an exhaust gas system of the internal combustion engine may have an advantage that, with a single mass flow sensor, a regulation of the amount of air which flows through the first and second air ducts takes place as a function of operating states of the internal combustion engine. A regulation of the amount of air is thus ensured with only one mass flow sensor in different operating states. The method according to the present invention or the device according to the present invention thus makes it particularly easy to control an internal combustion engine with regard to the air flow in a first and second air duct with particularly simple and cost-effective means. The costs for the operation of such an internal combustion engine are thereby kept very low.

Further advantages and improvements result from the measures of the present invention disclosed herein. According to an example embodiment of the present invention, in a first operating state of the internal combustion engine, it is ensured that air flows only through the second air duct. In this operating state, a particularly reliable regulation of the operation of the heater is thus enabled. This regulation of the operation of the heater is achieved in particular by controlling a delivery rate or rotational speed of an air pump and or a cross-section of a shut-off valve. Both measures achieve a simple and effective control of the air quantity. A comparison with an expected value which results from the control of the air pump and the opening of the valve achieves a simple diagnosis of all elements of the second air duct. Alternatively, the accuracy of the diagnosis can also be ensured if the oxygen content in the exhaust gas of the heater is compared with expected values which result from the operating data of the air pump, the shut-off valve, and an injected quantity of fuel into the heater. A continuous diagnosis of the operation of the heater can thus be ensured with high reliability.

According to an example embodiment of the present invention, in a second operating state, the amount of air flowing through the first air duct can be determined by subtracting the amount of air flowing through the second air duct from the amount of air flowing through the third air duct. A regulation of the air quantity which is supplied to the at least one cylinder of the internal combustion engine can take place in this way. In this case, a diagnosis can also be made very easily by comparing the amount of air flowing through the third air duct with expected values. These expected values are obtained particularly simply from the operating data of the at least one cylinder and the control elements in the first and second air duct. This method is particularly reliable if a diagnosis of the flow through the second air duct in the first operating state of the internal combustion engine has been carried out beforehand. Alternatively, an oxygen content in the exhaust gas of the heater can also be measured and compared with expected values that result from operating data of the control elements in the second air duct.

According to an example embodiment of the present invention, in a third operating state, in which there is a flow of air through only the first air duct, the measurement signal of the mass flow sensor in the third air duct can be used to regulate the flow through the first air duct. A diagnosis can again take place by comparing the measured amount of air flowing through the first air duct with an expected value that results from the operating data of the at least one cylinder 10.

BRIEF DESCRIPTION OF THE DRAWINGS

Exemplary embodiments of the present invention are illustrated in the figures and explained in more detail in the description below.

FIG. 1 shows an air system in which no air is being supplied to the cylinders of the internal combustion engine and a heater of the exhaust system is switched on.

FIG. 2 shows an air system of an internal combustion engine in which air is being supplied to the cylinders of the internal combustion engine, and a heater for heating the exhaust system of the internal combustion engine is switched on.

FIG. 3 shows an air system of an internal combustion engine in which air is being supplied to the cylinders of the internal combustion engine, and a heater for heating the exhaust system of the internal combustion engine is not switched on.

DETAILED DESCRIPTION OF EXAMPLE EMBODIMENTS

Figure 1:
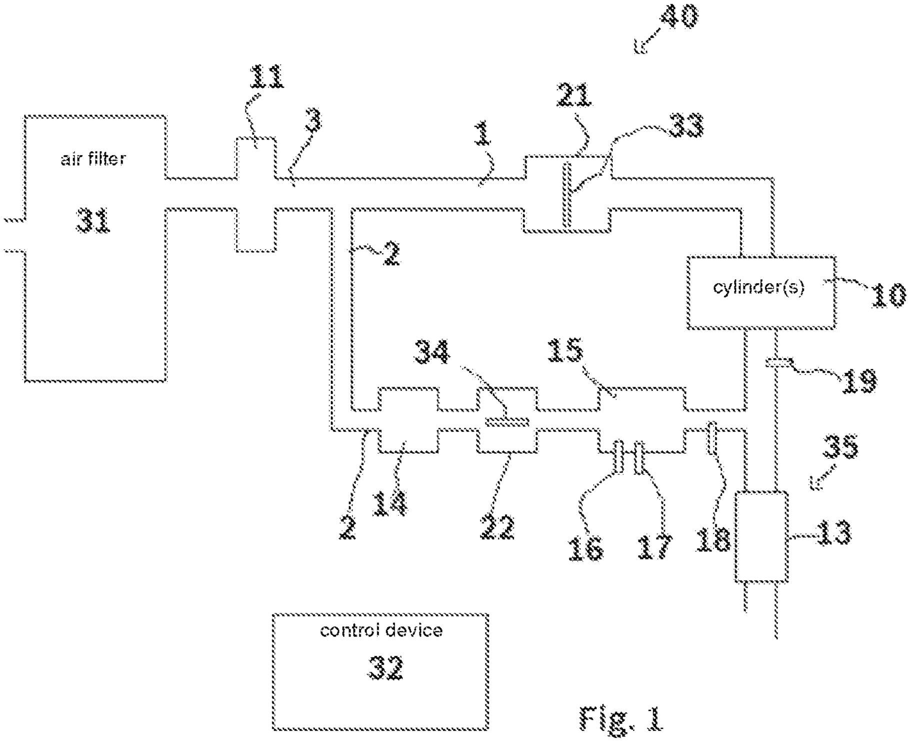

FIG. 1 schematically shows an internal combustion engine 40 with an air supply with a first air duct 1 and a second air duct 2. The air duct 1 is connected to an air filter 31 via a third air duct 3. The air duct 2 is likewise connected to the air filter 31 via the air duct 3. The air filter 31 filters ambient air and provides the filtered ambient air for the operation of the internal combustion engine 40, not only for the cylinders 10 but also for the heater 15.

Starting from the air duct 3, a throttle valve 21 and then at least one cylinder 10 are arranged in the first air duct 1. Starting from the air duct 3, an air pump 14, a shut-off valve 22 and then a heater 15 are arranged in the second air duct 2.

A sensor element 11, which has a mass flow sensor, is provided in the air duct 3. The mass flow sensor measures the mass of air that flows through the air duct 3. Furthermore, a pressure sensor and a temperature sensor can each additionally be provided in the sensor element 11. The pressure in the air duct 3 is measured by the pressure sensor. The temperature of the air flowing through the air duct 3 is measured by the temperature sensor. The air flowing through the air duct 3 can flow further to the cylinder 10 or the heater 15 corresponding to the actuation of the control elements, i.e., the throttle valve 21 and the air pump 14 and shut-off valve 22.

The mass which flows through the air duct 1 is controlled by the throttle valve 21. For this purpose, a valve flap 33 is actuated in such a way that it controls the air flow. FIG. 1 schematically shows a position of the valve flap 33 transverse to the air flow, which represents a closed valve flap 33 and thus no flow through the air duct 1. However, the valve flap 33 can also assume intermediate positions between open and closed, by means of which the amount of air that is sucked in by the cylinders 10 of the internal combustion engine is controlled.

The amount of air flowing through the air duct 2 is determined by the air pump 14 and the shut-off valve 22. Only when the air pump 14 is switched on is a negative pressure generated which leads to a flow in the second air duct 2. Furthermore, the amount of air flowing through the air duct 2 can be influenced as a function of the position of a valve flap 34 of the shut-off valve 22. The amount of air can be influenced by the delivery rate of the air pump 14 and the position of the valve flap 34. In a particularly simple embodiment, the valve flap 34 can only assume the completely open position or the completely closed position, and the air quantity is controlled only by the delivery rate or rotational speed of the air pump 14. In the representation in FIG. 1, the valve flap 34 is arranged longitudinally or in a laminar manner relative to the air flow, which corresponds to a fully open shut-off valve 22. In the representation in FIG. 1, an air flow through the air duct 2 toward the heater 15 is thus provided.

The cylinders 10 and the heater 15 are each connected to an exhaust system 35 so that the exhaust gases of the cylinders 10 and of the heater 15 are routed through the exhaust system 35. Catalytic converters 13 and at least one lambda sensor 19 are provided in the exhaust system 35. The catalytic converters 13 may have a plurality of partial catalytic converters, for example a first and a second three-way catalytic converter, a particle filter, and a catalytic converter for NOx reduction. The precise function and arrangement of the partial catalytic converters is not important for understanding the present invention. The residual oxygen content in the exhaust gas of the cylinder 10 is determined by the lambda sensor 19. It can thus be ensured that the total quantity of fuel introduced into the cylinders 10 is in a stoichiometric ratio to the introduced air, since only in such an operating range is good cleaning of the exhaust gas ensured.

The heater 15 comprises a fuel injector 16 and an igniter 17. The fuel injector 16 is designed as a conventional fuel injection valve and allows a precisely defined quantity of fuel to be introduced into the heater 15 for a heating operation. The igniter 17 is typically designed as a spark plug or as a glow plug for igniting a fuel/air mixture. A further lambda sensor 18 can optionally also be arranged in the connecting pipe between the heater 15 and the exhaust system 35, by means of which further lambda sensor it can be ensured that the quantity ratios of air and fuel in the heater 15 also correspond to a desired setpoint value.

Typically, the heater 15 is switched on before the internal combustion engine 40 is started or during an early operating phase of the internal combustion engine. For example, the start of an internal combustion engine can be delayed and initially only an operation of the heater 15 take place. A heating of the exhaust system 35 is thus already achieved before the start of an internal combustion engine. As a result of this measure, cleaning of the exhaust gas is already allowed in early operation of the internal combustion engine, since it is not necessary to wait until the exhaust gases of the cylinders 10 reach the operating temperature of the catalytic converters 13 for converting the exhaust gases in the exhaust system 35. A start of the internal combustion engine is therefore delayed for a short time (for example 1 to 10 seconds) in order to ensure a minimum temperature of the exhaust system at start-up of the internal combustion engine. Typically, a second operating phase is then carried out in which the internal combustion engine is already being operated by combustion processes in the cylinders 10 and, at the same time, heating by the heater 15 is also taking place. A further rapid heating of the exhaust system 35 up to an optimal operating temperature of the catalytic converters 13 is thereby ensured. In a third continuous operation of the combustion in the cylinders 10, it is possible for the heater 15 then not to be operated further. If operating phases occur with insufficient heat introduction into the exhaust system 35 during further operation of the internal combustion engine, the heater 15 can be activated again.

For controlling and diagnosing the device according to FIG. 1, a control device 32 is provided which (via lines not shown here) receives signals from all sensors and sends signals for controlling all control elements. The control device 32 processes the sensor signals and calculates control signals for the control elements. Accordingly, the diagnostic functions described below are executed by the control device 32. The control device 32 can also be a part of a large control device which can be a wide variety of control tasks for the operation of the internal combustion engine or of a vehicle in which the internal combustion engine is installed.

In FIG. 1, the throttle valve 21 is closed and the air pump 14 is activated, and the shut-off valve 22 is open. FIG. 1 thus shows an operating state in which the cylinder 10 (or the plurality of cylinders, if a plurality of cylinders is provided) of the internal combustion engine are not in operation and thus no air is flowing through the air duct 1 to the cylinder 10. The shut-off valve 22 is open and the air pump 14 is activated. This operating state thus corresponds to a heating of the exhaust system 35 with no combustion taking place in the cylinders 10. This is the case, for example, in an upstream heating operation of the exhaust system 35 before the internal combustion engine is started, for example during a cold start.

Since no air is flowing through the air duct 1, in the case of correct operation, the mass flow through the sensor element 11 corresponds to the mass flow through the second air duct. The measurement signal of the mass flow sensor in the sensor element 11 can therefore be used for regulating the operation of the heater 15. In particular, in a dynamic first operating phase, for example when the rotational speed of the air pump 14 changes dynamically, it is therefore possible to regulate the operation of the heater 15 using the measured signal of the mass flow sensor. Accordingly, in this operating phase, for example the quantity of fuel injected into the heater 15 can be adjusted in accordance with the measured air quantity.

If the flow conditions in the second air duct have stabilized such that a dynamic operating phase, i.e., a run-up of the air pump 14, is no longer present, the measured signal of the mass flow sensor in the sensor element 11 can also be used for a precise regulation of the rotational speed of the air pump 14 or the position of the shut-off valve 34. Small changes in the air pump 14, the air duct 2, or the shut-off valve 34 can be compensated in this way.

The operation with stabilized flow in the second air duct 2 also enables a diagnosis of the second air duct 2. For this purpose, the measured mass flow through the air duct 3, i.e. corresponding to the mass flow through the air duct 2, is compared to an expected value which arises from the controlling of the air pump 14 and, if applicable, the opening of the valve 22 or the position of the valve flap 34. If the flow through the air duct 2 is controlled not only by the operating data of the air pump 14 but also by the position of the valve flap 34, both values will have to be taken into account for the formation of an expected value. If the flow through the air duct 2 is defined only by the operating data of the air pump 14, in particular a delivery rate or rotational speed, then only the operating data of the air pump will have to be taken into account for the formation of an expected value. If it is then determined that the mass flow through the air duct 2 does not correspond to the expected value or the deviation from the expected value is too large, a fault in the air duct 2 will be detected. Such a fault can be, for example, a leak of the air duct 2 toward the ambient air, a fault in the pump 14 or a malfunction in the valve 22. If a pressure sensor is also provided in the sensor element 12, a pressure signal can alternatively also be used for this diagnosis.

The operation of the internal combustion engine 40, as shown in FIG. 1, also makes possible a further diagnosis using the lambda sensor 18. A disturbance of the ratio of air and fuel in the heater 15 has a direct effect on the oxygen content of the exhaust gas of the heater 15. The aim is an operation in which air and fuel are introduced into the heater 15 in a stoichiometric ratio, i.e., the same amount of oxygen is available as is required for the combustion of the introduced fuel. A deviation from this can in particular give an indication of a leak in the air duct 2 or an insufficient amount of fuel that has been injected into the heater 15. In the same way, deviations from desired sub-and superstoichiometric operating phases can also be diagnosed.

Figure 2:
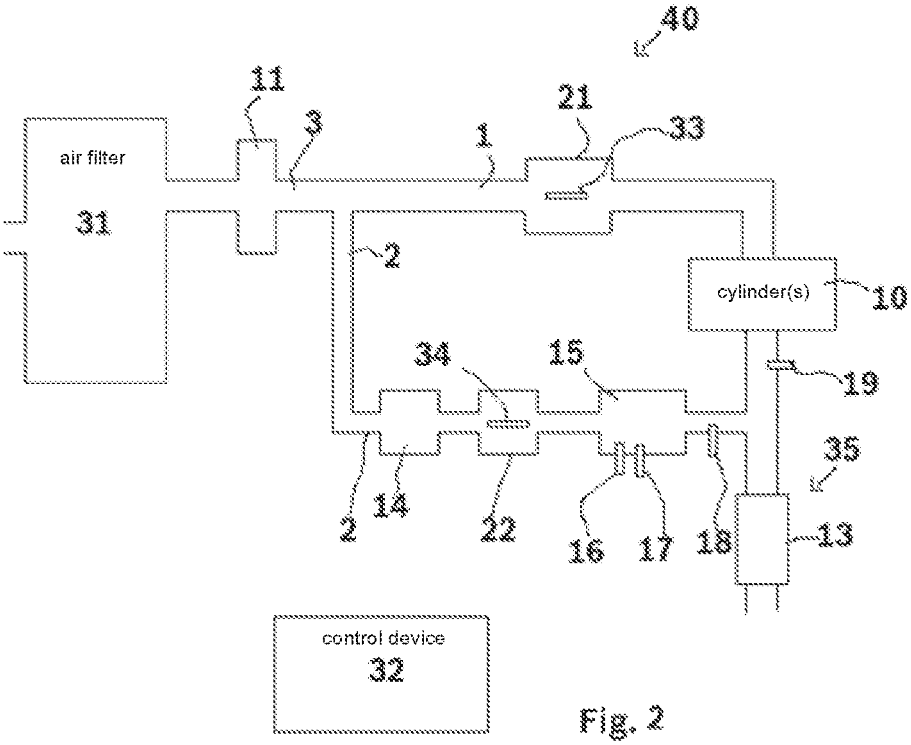

FIG. 2 shows an internal combustion engine 40 with all elements, as has already been described for FIG. 1. In contrast to FIG. 1, however, the valve plate 33 of the throttle valve 21 is shown open and the valve plate 34 of the shut-off valve 22 is also shown open. This is therefore a second operating state of the internal combustion engine 40 in which the cylinders 10 and the heater 15 are simultaneously supplied with air. Such an operating state is useful for achieving a further heating of the exhaust system 35 up to an optimal operating temperature for the catalytic converters 13. After a first heating of the exhaust system 35 to a minimum temperature from which the catalytic converters 13 operate (emissions already converted to parts) , a further heating up to the optimal temperature is effected by a simultaneous heating with exhaust gases of the cylinders 10 and of the heater 15. Furthermore, such an operating state can make sense if only a small amount of heat is introduced by the cylinders 10 into the exhaust system 35 during normal operation. This can be the case, for example, in the case of longer overrun phases (for example, driving downhill, no heat release into the exhaust system 35, resulting in rapid cooling) or even in lower partial-load operation (for example, stop-and-go operation, start-stop operation, idling operation) if only small amounts of fuel are introduced into the cylinders 10, which results in reduced heat release/ exhaust gas temperatures of the internal combustion engine 40.

In this second operating state, the amount of air flowing through the air duct 3 is divided between the first air duct 1 and the second air duct 2. The air flow through the first air duct 1 was used to supply the at least one cylinder 10 with air for combustion in the cylinder 10. The air flowing through the second air duct 2 is used to supply the heater 15. During normal operation, the amount of air flowing through the second air duct 2 can also be determined with good reliability based on the operating data of the air pump 14 and the shut-off valve 34. This reliability is also achieved in that, in the first operating phase, a diagnosis of the flow through the second air duct 2 has already taken place, as has already been described for FIG. 1. Since the second operating phase takes place after the first operating phase, it can therefore be assumed that the flow through the second air duct 2 can be reliably determined based on the operating conditions of the air pump 14 or of the shut-off valve (s) 34. The flow thus determined through the second air duct 2 is therefore subtracted from the measured signal of the mass flow sensor in the sensor element 11 in order to obtain the amount of air flowing through the first air duct. In this second operating state, a regulation of the amount of air flowing through the first air duct 1 to the at least one cylinder 10 can therefore take place based on the thus determined flow through the first air duct 1.

Furthermore, in this second operating state a diagnosis can also take place in which the amount of air which flows through the third air duct 3 is compared with expected values which result from operating data of the at least one cylinder 10 and the control elements in the first and second air ducts 1, 2. The expected value for the mass flow through the air duct 1 results from the operating parameters of the at least one cylinder 10, for example the rotational speed of the internal combustion engine and load, and from the control of the throttle valve 21, for example the position of the valve plate 33 in the throttle valve 21. The expected value for the mass flow through the air duct 2 results from the operating parameters of the air pump 14 and the valve 22. Here again, a diagnosis of the flow through the second air duct 2 has already taken place through a diagnosis in the first operating state. Since in this way a good reliability of the air flow through the second air duct 2 is ensured, possible deviations of the measured amount of air flowing through the third air duct 3 can be associated with deviations in the first air duct 1. Such deviations can be associated, for example, through the throttle flap 21 or through the operating states of the at least one cylinder 10 or actuators of the cylinder 10 or sensors of the cylinder 10.

In this diagnosis, the oxygen content in the exhaust gas of the heater 15 can additionally also be measured and compared with expected values which result from the operating data of the control elements in the second air duct 2, i.e., the air pump 14 and the shut-off valve 34. This check additionally ensures that the flow of air through the second air duct 2 corresponds to the planned expected value. It is thus additionally ensured that a found deviation of the measured mass flow of air through the third air duct 3 is to be associated with a deviation of the flow through the first air duct 1.

Figure 3:
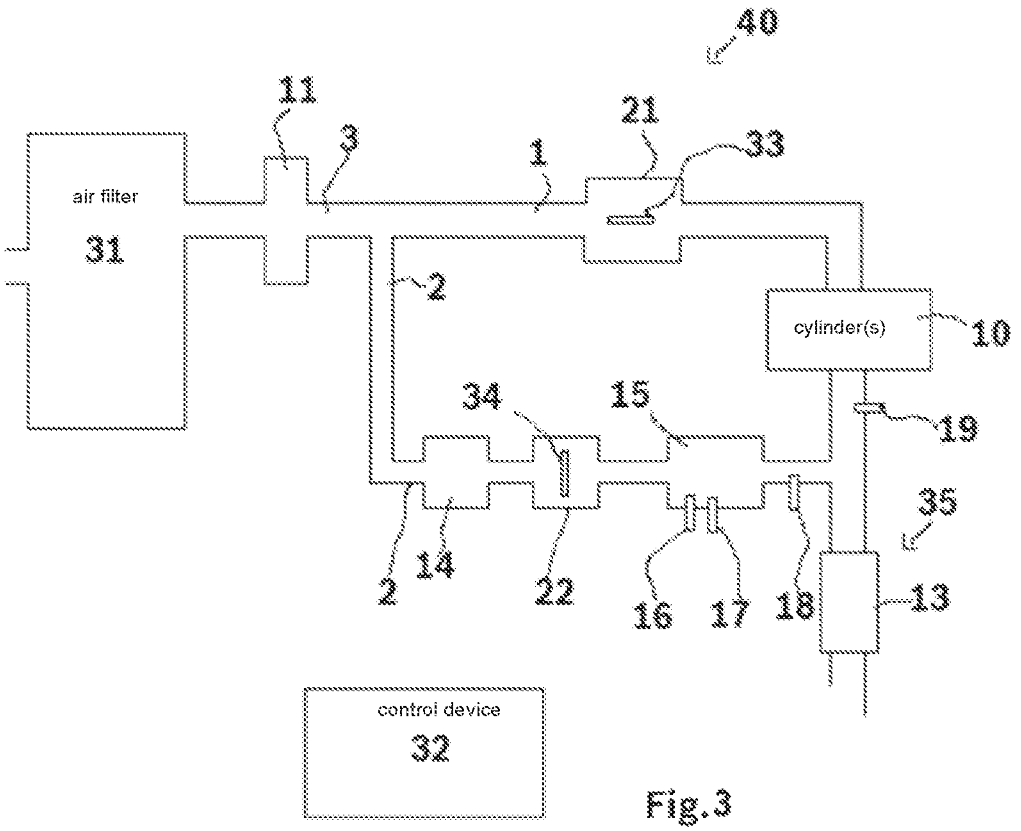

FIG. 3 shows an internal combustion engine 40 with all elements, as has already been described for FIG. 1 or 2. In contrast to FIG. 1, however, the valve plate 33 of the throttle valve 21 is shown open and the valve plate 34 of the shut-off valve 22 is shown closed. This is therefore a third operating state of the internal combustion engine 40 in which the cylinders 10 are supplied with air and the heater 15 is not in operation. This is therefore a normal operation of the internal combustion engine 40, without additional heating provided by the heater 15. Since during fault-free operation there is no air flowing through the air duct 2, the mass flow sensor 11 measures the air flow which is supplied to the cylinders 10 for combustion. A simple diagnosis can thus take place in that this measurement signal of the air mass sensor 11 is compared to an expected value which results from the operating data of the cylinders 10, in particular rotational speed or load, and from the operating data of the throttle valve 21, in particular the position of the valve plate 33.

What is claimed is:

1. A method for operating an internal combustion engine, the internal combustion engine including a first air duct configured to supply air to at least one cylinder of the internal combustion engine, and a second air duct configured to supply air to a heater situated in the second air duct for heating an exhaust system of the internal combustion engine, wherein the first air duct and the second air duct each have at least one control element configured to control an amount of air flowing through, wherein the first air duct and the second air ducts are connected by a third air duct to an air filter for providing filtered ambient air to the internal combustion engine, wherein a mass flow sensor configured to measure an amount of air flowing through the third air duct is arranged in the third air duct, the method comprising:

regulating, using the measured signal of the mass flow sensor, the amount of air flowing through the first air duct and the second air duct as a function of operating states of the internal combustion engine, wherein the control element in the first air duct includes a first valve, and wherein the control element in the second air duct includes an air pump and a second valve, the second valve being situated between the air pump and the heater;

in a first operating state of the internal combustion engine, (i) closing the first valve in the first air duct so that no air flows through the first air duct, (ii) switching on the air pump and opening the second valve such that air for operation of the heater flows through the second air duct, and (iii) regulating the amount of air for operating the heater using the measured signal of the mass flow sensor in the third air duct, the regulating including: (a) controlling of a delivery rate or rotational speed of the air pump, and (b) controlling a cross-section of the opening of the second valve.

2. The method for operating an internal combustion engine according to claim 1, wherein a diagnosis takes place by comparing: (i) the measured signal of the mass flow sensor in the third air duct or a pressure signal in the third air duct with (ii) an expected value which results from the controlling of the air pump and the opening of the second valve.

3. The method for operating an internal combustion engine according to claim 2, wherein a diagnosis takes place by measuring an oxygen content in exhaust gas of the heater downstream of the heater and, for the diagnosis, comparing the measured oxygen content with an expected value which results from the controlling of the air pump and the opening of the second valve.

4. The method for operating an internal combustion engine according to claim 1, wherein:

in a second operating state of the air supply, internal combustion engine following the first operating state: (i) the first valve is opened in the first air duct so that air flows through the first air duct to the at least one cylinder, (ii) the air pump is switched on and the second valve is open, and that from operating data of the air pump and the second valve, the amount of air flowing through the second air duct is determined, and that the amount of air flowing through the second air duct is subtracted from the amount of air flowing through the third air duct to ascertain the amount of air flowing through the first air duct.

5. The method for operating an internal combustion engine according to claim 4, wherein, for a diagnosis, the amount of air flowing through the third air duct is compared with expected values which have been ascertained from operating data of the at least one cylinder and the at least one control elements in the first and second air duct.

6. The method for operating an internal combustion engine according to claim 5, wherein, for a diagnosis, downstream of the heater, an oxygen content in exhaust gas of the heater is measured in the second air duct and is compared with expected values that were ascertained from operating data of the at least one control element in the second air duct.

7. The method for operating an internal combustion engine according to claim 1, wherein, in a third operating state of the internal combustion engine, the first in the first air duct is open so that air flows through the first air duct to the at least one cylinder, and the third operating state of the internal combustion engine includes switching off the air pump, closing the second valve, and turning off the heater, and wherein the amount of air that flows through the third air duct is considered as the amount of air flowing through the first air duct and is used for the regulation of the amount of air supplied to the at least one cylinder.

8. The method for operating an internal combustion engine according to claim 7, wherein, for a diagnosis, the amount of air flowing through the first air duct is compared with an expected value which results from operating data of the at least one cylinder and the at least one control element in the first air duct.

9. The method for operating an internal combustion engine according to claim 1, further comprising:

in the first operating state, regulating using the measured signal of the mass flow sensor in the third air duct, an amount of fuel injected into the heater.

10. A device for operating an internal combustion engine, the device comprising a processor, the internal combustion engine having a first air duct configured to supply air to a cylinder of the internal combustion engine and a second air duct configured to supply air to a heater situated in the second air duct for heating an exhaust system of the internal combustion engine, wherein the first air duct and the second air duct each have at least one control element for controlling an amount of air flowing through, wherein the first air duct and the second air duct are connected by a third air duct to an air filter for providing filtered ambient air to the internal combustion engine, wherein a mass flow sensor configured to measure an amount of air flowing through the third air duct is arranged in the third air duct, the device being configured to regulate, using the measured signal of the mass flow sensor, an amount of air flowing through the first air duct and the second air duct as a function of operating states of the internal combustion engine, wherein the control element in the first air duct includes a first valve, and wherein the control element in the second air duct includes an air pump and a second valve, the second valve being situated between the air pump and the heater; wherein, in a first operating state of the internal combustion engine, the device being configured to (i) close the first valve in the first air duct so that no air flows through the first air duct, (ii)

switch on the air pump and opening the second valve such that air for operation of the heater flows through the second air duct, and (iii) regulate the amount of air for operating the heater using the measured signal of the mass flow sensor in the third air duct, the regulating including: (a) controlling of a delivery rate or rotational speed of the air pump, and (b) controlling a cross-section of the opening of the second valve.

11. The device of claim 10, wherein the device is configured to, in the first operating state, regulate using the measured signal of the mass flow sensor in the third air duct, an amount of fuel injected into the heater.

* * * * *